US009645677B2

United States Patent
Sagawai et al.

(10) Patent No.: US 9,645,677 B2
(45) Date of Patent: May 9, 2017

(54) CAPACITIVE SENSING DEVICE

(71) Applicant: ALPS ELECTRIC CO., LTD., Tokyo (JP)

(72) Inventors: Shinichi Sagawai, Miyagi-ken (JP); Ikuyasu Miyako, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 2 days.

(21) Appl. No.: 14/871,543

(22) Filed: Sep. 30, 2015

(65) Prior Publication Data
US 2016/0117049 A1 Apr. 28, 2016

(30) Foreign Application Priority Data

Oct. 22, 2014 (JP) ................................. 2014-215705

(51) Int. Cl.
*G06F 3/045* (2006.01)
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01)

(58) Field of Classification Search
CPC ........ G06F 3/041; G06F 3/0418; G06F 3/044; G06F 17/16; G06F 2203/04108; G09G 3/2085; G01R 27/2605
See application file for complete search history.

(56) References Cited

U.S. PATENT DOCUMENTS

| 2001/0043478 | A1  | 11/2001 | Yun |
| 2010/0060591 | A1* | 3/2010  | Yousefpor ............... G06F 3/044 345/173 |
| 2010/0244859 | A1* | 9/2010  | Cormier, Jr. ............ G06F 3/044 324/678 |
| 2011/0043478 | A1* | 2/2011  | Matsushima ......... G06F 3/0416 345/174 |
| 2011/0055305 | A1* | 3/2011  | Matsushima ......... G06F 3/0416 708/400 |
| 2011/0061948 | A1* | 3/2011  | Krah ..................... G06F 3/0418 178/18.01 |
| 2011/0063154 | A1* | 3/2011  | Hotelling .............. H03M 3/494 341/143 |
| 2013/0021294 | A1* | 1/2013  | Maharyta ................ G06F 3/044 345/174 |
| 2014/0035874 | A1* | 2/2014  | Iizuka .................... G06F 3/044 345/174 |

(Continued)

FOREIGN PATENT DOCUMENTS

WO WO 2009/107415 9/2009

*Primary Examiner* — Joe H Cheng
(74) *Attorney, Agent, or Firm* — Beyer Law Group LLP

(57) ABSTRACT

A driving signal is applied to a plurality of driving electrodes using the driving matrix illustrated in FIG. 5A obtained by removing a row in which a sum of codes is greatest and a column having a transposition relationship with the row in a Hadamard matrix. Distribution of capacitance in intersection portions between a sensing electrode and a plurality of driving electrodes can be obtained using an inverse matrix of the driving matrix illustrated in FIG. 5B. Further, when decoding is performed using an extended matrix obtained by replacing "0" with "−1" in FIG. 5B, it is possible to average noise and to improve an S/N ratio.

6 Claims, 15 Drawing Sheets

(56) References Cited

U.S. PATENT DOCUMENTS

| | | | |
|---|---|---|---|
| 2014/0104236 A1* | 4/2014 | Hamaguchi | G06F 3/044 345/174 |
| 2015/0268758 A1* | 9/2015 | Lo | G06F 3/0416 345/174 |
| 2016/0041645 A1* | 2/2016 | Ray | G06F 3/0418 345/174 |

* cited by examiner

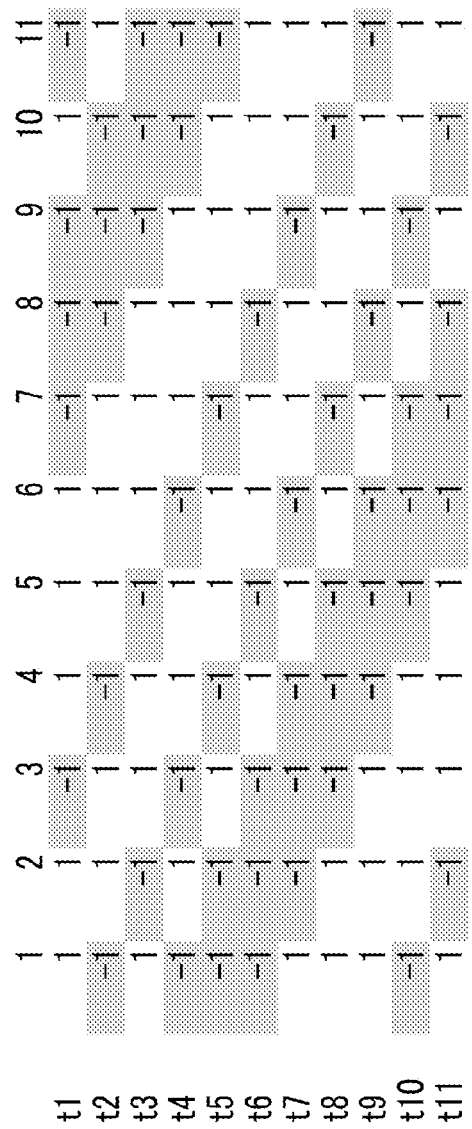

FIG. 7A

ORIGINAL SIGNAL

| 1 | 2 | 1 | 2 | 7 | 10 | 8 | 2 | 1 | 2 | 1 | SUM |

ORIGINAL SIGNAL × DRIVING PATTERN (SENSED VALUE)

| 1 | 2 | -1 | 2 | 7 | 10 | -8 | -2 | -1 | 2 | -1 | 11 |
|---|---|---|---|---|---|---|---|---|---|---|---|
| -1 | 2 | 1 | -2 | 7 | 10 | 8 | -2 | -1 | -2 | 1 | 21 |
| 1 | -2 | 1 | 2 | -7 | 10 | 8 | 2 | -1 | -2 | -1 | 11 |
| -1 | 2 | -1 | 2 | 7 | -10 | 8 | 2 | 1 | -2 | -1 | 7 |
| -1 | -2 | 1 | -2 | 7 | 10 | -8 | 2 | 1 | 2 | -1 | 9 |
| -1 | -2 | -1 | 2 | -7 | 10 | 8 | -2 | 1 | 2 | 1 | 11 |
| 1 | -2 | -1 | -2 | 7 | -10 | 8 | 2 | -1 | 2 | 1 | 5 |
| 1 | 2 | -1 | -2 | -7 | 10 | -8 | 2 | 1 | -2 | 1 | -3 |
| 1 | 2 | 1 | -2 | -7 | -10 | 8 | -2 | 1 | 2 | -1 | -7 |
| -1 | 2 | 1 | 2 | -7 | -10 | -8 | 2 | -1 | 2 | 1 | -17 |
| 1 | -2 | 1 | 2 | 7 | -10 | -8 | -2 | 1 | -2 | 1 | -11 |

FIG. 7B

SUM (SENSED VALUE)

11  21  11  7  9  11  5  -3  -7  -17  -11

SUM (SENSED VALUE) × EXTENDED INVERSE MATRIX (DECODED VALUE)

| 11 | -21 | 11 | -7 | -9 | -11 | 5 | -3 | -7 | 17 | -11 | -2.3 |
|---|---|---|---|---|---|---|---|---|---|---|---|
| 11 | 21 | -11 | 7 | -9 | -11 | -5 | -3 | -7 | -17 | 11 | -1.2 |
| -11 | 21 | 11 | -7 | 9 | -11 | -5 | 3 | -7 | -17 | -11 | -2.3 |
| 11 | -21 | 11 | 7 | -9 | 11 | -5 | 3 | 7 | -17 | -11 | -1.2 |
| 11 | 21 | -11 | 7 | 9 | -11 | 5 | 3 | 7 | 17 | -11 | 4.3 |
| 11 | 21 | 11 | -7 | 9 | 11 | -5 | -3 | 7 | 17 | 11 | 7.5 |
| -11 | 21 | 11 | 7 | -9 | 11 | 5 | 3 | -7 | 17 | 11 | 5.4 |
| -11 | -21 | 11 | 7 | 9 | -11 | 5 | -3 | 7 | -17 | 11 | -1.2 |
| -11 | -21 | -11 | 7 | 9 | 11 | -5 | -3 | -7 | 17 | -11 | -2.3 |
| 11 | -21 | -11 | -7 | 9 | 11 | 5 | 3 | -7 | -17 | 11 | -1.2 |
| -11 | 21 | -11 | -7 | -9 | 11 | 5 | -3 | 7 | -17 | -11 | -2.3 |

FIG. 12

| ORIGINAL SIGNAL | 1 | 2 | 7 | 8 | 6 | 1 | 2 | SUM (SENSED VALUE) |
|---|---|---|---|---|---|---|---|---|
| | ORIGINAL SIGNAL × DRIVING PATTERN | | | | | | | |
| | 1 | 2 | 3 | 4 | 5 | 6 | 7 | |
| t1 | 1 | 2 | 7 | −8 | −6 | −1 | −2 | −7 |
| t2 | 1 | −2 | −7 | −8 | −6 | −1 | 2 | −19 |
| t3 | 1 | −2 | −7 | 8 | 6 | −1 | −2 | 3 |
| t4 | −1 | −2 | 7 | −8 | 6 | 1 | 2 | 7 |
| t5 | −1 | −2 | 7 | −8 | 6 | −1 | −2 | 1 |
| t6 | −1 | 2 | −7 | 8 | 6 | 1 | −2 | −7 |
| t7 | −1 | 2 | −7 | 8 | −6 | 1 | −2 | −5 |

FIG. 13A

SUM (SENSED VALUE) × INVERSE MATRIX

| | −7 | −19 | 3 | 7 | 1 | −7 | −5 | SUM (DECODED VALUE) |
|---|---|---|---|---|---|---|---|---|
| 1 | 1 | 2 | 3 | 4 | 5 | 6 | −5 | 1 |
| 2 | 0 | 0 | 0 | −7 | −1 | 7 | 7 | 2 |
| 3 | 0 | 19 | −3 | 0 | −1 | 0 | 0 | 7 |
| 4 | 0 | 19 | −3 | −7 | 0 | 7 | 5 | 8 |
| 5 | 7 | 19 | 0 | 0 | 0 | 0 | 0 | 6 |
| 6 | 7 | 0 | −3 | −7 | −1 | 7 | 5 | 1 |
| 7 | 7 | 0 | 0 | 0 | −1 | 0 | 5 | 2 |

FIG. 13B

SUM (SENSED VALUE) × EXTENDED INVERSE MATRIX

| | −7 | −19 | 3 | 7 | 1 | −7 | 5 | SUM (DECODED VALUE) |
|---|---|---|---|---|---|---|---|---|
| 1 | 1 | 2 | 3 | 4 | 5 | 6 | 7 | −2.71429 |
| 2 | −7 | 19 | −3 | −7 | −1 | 7 | −5 | −1.57143 |
| 3 | −7 | 19 | 3 | 7 | −1 | −7 | 5 | 4.142857 |
| 4 | −7 | 19 | −3 | 7 | 1 | −7 | −5 | 5.285714 |
| 5 | 7 | −19 | 3 | −7 | 1 | −7 | 5 | 3 |
| 6 | 7 | 0 | −3 | 7 | −1 | 7 | −5 | −2.71429 |
| 7 | 7 | −19 | 3 | 7 | −1 | 7 | 5 | −1.57143 |

CAPACITIVE SENSING DEVICE

CLAIM OF PRIORITY

This application claims benefit of Japanese Patent Application No. 2014-215705 filed on Oct. 22, 2014, which is hereby incorporated by reference.

BACKGROUND OF THE INVENTION

1. Field of the Invention

The present invention relates to a capacitive sensing device in which capacitance is formed between a plurality of driving electrodes and at least one sensing electrode, and more particularly, to a capacitive sensing device of a multi-driving scheme in which a driving signal is simultaneously applied to a plurality of driving electrodes.

2. Description of the Related Art

A mutual capacitive sensing device and a self-capacitive capacitive sensing device are known as capacitive sensing devices including a touch pad. The mutual capacitive sensing device includes a plurality of driving electrodes formed in a column direction, and a plurality of sensing electrodes extending in a row direction. The driving electrode and the sensing electrode are insulated and intersect, and capacitance is formed between the driving electrode and the sensing electrode.

A driving scheme in the mutual capacitive sensing device of the related art is referred to as a 1-hot driving scheme. There is a driving scheme in which a driving signal is sequentially applied to a plurality of driving electrodes, and a change in capacitance at an intersection between the driving electrode and a sensing electrode is obtained from a sensed value from each sensing electrode when the driving signal is applied. However, in the 1-hot driving scheme, since only information on the capacitance at one intersection is obtained from the sensing electrode when the driving signal is applied to the driving electrode, there is a disadvantage in that influence of noise increases and an S/N ratio of capacitance to be detected increases.

On the other hand, in the multi-driving scheme in which a driving signal is simultaneously applied to a plurality of driving electrodes, a sensed value based on capacitance according to the number of a plurality of intersection portions between one sensing electrode and a plurality of driving electrodes is obtained from the one sensing electrode. Therefore, random noise generated when a change in the capacitance in each intersection portion is obtained is averaged and reduced, an S/N ratio is improved, and a relatively high sensitivity is achieved.

In multi-driving of the mutual capacitive sensing device, values of the capacitances at the intersections with the plurality of driving electrodes are detected through superimposition on one sensing electrode. In the driving scheme, a plurality of patterns of a combination of codes in a normal phase (1) and an opposite phase (−1) of the driving signal are prepared, and driving signals based on the respective driving patterns are sequentially applied to the plurality of driving electrodes. When the number of driving electrodes to which the driving signal is simultaneously applied is n, the number of intersections between one sensing electrode and the driving electrodes is n, and accordingly, n driving patterns that are n combinations of the codes of the normal phase (1) or the opposite phase (−1) are used. Thus, a combination of the codes of the driving signal applied to the n driving electrodes is an n×n square matrix.

In the multi-driving scheme, it is possible to obtain decoded values by multiplying the sensed values obtained from the respective sensing electrodes by an inverse matrix of a matrix of the driving pattern. Here, when the code of the decoding matrix is "1", "1" or "0", a decoding operation of n sensed values obtained from one sensing electrode can be performed by only addition and subtraction.

Therefore, using a so-called Hadamard matrix as the matrix of the driving pattern has been proposed in Pamphlet of International Publication No. WO2009/107415 below or the like. The Hadamard matrix can include codes "−1" and "1", an inverse matrix thereof is the same as a transposed matrix of the Hadamard matrix, and a decoding matrix for performing a code operation can include "1" and "−1". Further, since it is not necessary to set an inverse matrix for a decoding operation different from the matrix of the driving pattern, and the inverse matrix obtained by replacing a row and a column in the matrix of the driving pattern can be used for the decoding operation, the Hadamard matrix is suitable for use for a system with a small memory.

However, in the multi-driving scheme of simultaneously driving a plurality of electrodes, the following problems remain unsolved.

First, when a driving signal is simultaneously applied to a plurality of driving electrodes using a n×n matrix, if a balance of sums of the codes of a normal phase (1) and an opposite phase (−1) of the plurality of driving signals is greatly collapsed, a sensed value obtained from one sensing electrode increases. One example of the Hadamard matrix used as the driving signal is described in paragraph [0065] of Pamphlet of International Publication No. WO2009/107415, but in this matrix, driving signals applied to the plurality of driving electrodes at a timing of a first row are all in a normal phase (1). When all the n driving electrodes are driven using the code "1", the sensed value becomes n times the sensed value when one driving electrode is driven.

Capacitance (base capacitance) in an intersection portion between the driving electrode and the sensing electrode is very great, whereas a change in capacitance when a finger or the like has approached the intersection portion is very small. In the 1-hot driving scheme of the related art, since the base capacitance in the intersection portion between individual electrodes is substantially constant, a sensing circuit can uniformly cancel the base capacitance, and amplify and read only an amount of the change. On the other hand, in the multi-driving scheme, when the balance of the sum of the codes of respective rows applied to one sensing electrode (at each time) is greatly changed, the base capacitance is not uniformly cancelled, unlike the 1-hot scheme. For example, in a driving scheme using the code shown in the paragraph [0065] of Pamphlet of International Publication No. WO2009/107415, since all eight driving electrodes are driven in phase in the first row, the base capacitance in the row has a value of eight times, a small amount of change in the capacitance placed on the great base capacitance is detected. The balance between a sensed value in this row and sensed values of a second row and subsequent rows is significantly shifted.

When the sensed value is subjected to A/D conversion, an analog value is converted into a digital value with a certain limited resolution. For example, the number of cases of 8 bits is 0 to 255. Here, in the multi-driving scheme, if a large change in balance of the sum of the codes in each row (at each time) is to be detected in a range from 0 to 255 of the same A/D converter, a range of values corresponding to a small amount of change in the capacitance placed on great base capacitance is greatly narrowed in order to convert the analog value to the digital value within the numerical range even when the base capacitance is greatest, and detection resolution is degraded. Thus, when the balance of the sum of the codes in each row (at each time) is greatly changed, it is necessary to increase the bit number of the A/D converter, and a circuit cost increases.

Next, when the balance of the sum of the codes in a normal phase (1) and an opposite phase (−1) of the driving signal simultaneously applied to the plurality of driving electrodes is greatly collapsed, radiated noise emitted from the driving electrode increases with the increase of the sum of codes. In an example of the Hadamard matrix described in paragraph [0065] of Pamphlet of International Publication No. WO2009/107415, since the driving signal of "1" is simultaneously applied to all the driving electrodes at a timing of the first row, the radiated noise greatly increases.

The radiation of the noise can be relatively reduced if a frequency thereof is out of a range of regulation and is, for example, approximately 150 kHz. However, in a typical ASIC, since the driving signal applied to the driving electrode is a rectangular wave, multiplication frequencies are widely included on a high frequency side even when a driving frequency is 150 kHz or lower, and thus, the multiplication frequencies cannot be avoided from a high frequency band. Therefore, when a matrix in which a sum of the codes of the row increases is used, radiated noise increases when the driving electrode is driven at a relatively low frequency.

Then, in paragraph [0071] of Pamphlet of International Publication No. WO2009/107415, the matrix used as the driving signal includes a combination of codes "1", "4", and "0". In this matrix, a maximum sum of the codes of each row is "2", and the above-described problem of the increase in the sensed value or the radiated noise is solved. However, in this matrix, since the number of driving electrodes to which the driving signal is applied at a timing of each row is limited to 2, effects of averaging of the noise and reduction of the S/N ratio, which are original purposes of the multi-driving scheme, are somewhat degraded.

SUMMARY OF THE INVENTION

The present invention provides a capacitive sensing device capable of realizing averaging and reduction of noise using a multi-driving scheme of simultaneously providing a driving signal to a plurality of electrodes and simplifying a circuit configuration and reducing radiated noise by decreasing a sum of codes of each row.

According to an aspect of the present invention, there is provided a capacitive sensing device which includes a plurality of driving electrodes formed in a column direction, and at least one sensing electrode formed in a row direction, and in which capacitance is formed between the sensing electrode and the driving electrode, the device including: a multi-driving unit configured to simultaneously apply a driving signal to N driving electrodes; a sensing unit configured to obtain sensed values from the sensing electrodes; and a control unit configured to set codes of the driving signal to be applied from the multi-driving unit to N driving electrodes and decode the sensed values, in which the codes are represented by an N×N driving matrix, the sensed values of the sensing electrodes are decoded using a decoding matrix that is an inverse matrix of the driving matrix, and accordingly, distribution of capacitance between the driving electrodes and the sensing electrodes is obtained, and the driving matrix is an N×N matrix obtained by removing a row and a column in which a sum of codes in a row direction and a column direction is greatest from a Hadamard matrix in which the number of rows and the number of columns exceed N, and the decoding matrix is an inverse matrix including a code "0".

In the present invention, for example, the row and the column in which the sum is greatest may include the same code "−1" or "−1".

In the capacitive sensing device of the present invention, since the driving matrix is configured of a matrix obtained by removing the row and the column in which the sum of the codes is greatest in the Hadamard matrix, a variation in a sum of base capacitances of the sensed value obtained in the sensing electrode can be reduced. Therefore, even when an A/D converter having a relatively small bit number is used, a change in capacitance can be detected with high resolution. Further, it is possible to reduce the sum of the codes of the driving signal simultaneously applied to the plurality of driving electrodes, and prevent radiated noise from increasing.

In the capacitive sensing device of the present invention, as the decoding matrix, an extended matrix obtained by replacing the code "0" with "1" or "−1" is preferably used, instead of an inverse matrix including a code "0".

In the above configuration, since there is no row in which the code is "0", it is possible to enhance the effect of reducing noise of the sensed value based on the capacitance obtained at a plurality of intersections between the plurality of driving electrodes and the sensing electrode.

In the present invention, the Hadamard matrix may be based on a Bailey method. Alternatively, the Hadamard matrix may be based on a Sylvester method.

According to another aspect of the present invention, there is provided a capacitive sensing device which includes a plurality of driving electrodes formed in a column direction, and at least one sensing electrode formed in a row direction, and in which capacitance is formed between the sensing electrode and the driving electrode, the device including: a multi-driving unit configured to simultaneously apply a driving signal to N driving electrodes; a sensing unit configured to obtain sensed values from the sensing electrodes; and a control unit configured to set codes of the driving signal to be applied from the multi-driving unit to N driving electrodes and decode the sensed values, in which the codes are represented by an N×N driving matrix, the sensed values of the sensing electrodes are decoded using a decoding matrix that is an inverse matrix of the driving matrix, and accordingly, distribution of capacitance between the driving electrodes and the sensing electrodes is obtained, and the decoding matrix is an extended matrix obtained by replacing a code "0" with "1" or "−1" in a matrix including a code "0" that is an inverse matrix of the driving matrix.

In the capacitive sensing device of the present invention, it is preferable that the driving matrix is an N×N matrix obtained by removing a row and a column in which a sum of codes in a row direction and a column direction is greatest from a Hadamard matrix in which the number of rows and the number of columns exceed N.

In this case, the Hadamard matrix may be based on a Bailey method. Alternatively, the Hadamard matrix may be based on a Sylvester method.

In the capacitive sensing device of the present invention, a matrix obtained by removing a row and a column in which a sum of codes is greatest from a basic matrix such as the Hadamard matrix is used as the driving matrix. Therefore, a variation in the sensed value obtained from one sensing electrode is reduced such that an amount of a change in capacitance can be detected with high resolution. Further, since the sum of the codes of the driving signal when the driving signal is simultaneously applied to the plurality of driving electrodes can decrease, an increase in radiated noise can be suppressed.

Further, it is possible to enhance the effect of averaging the noise in the sensed value obtained from one sensing electrode and improve an S/N ratio by replacing the code "0" included in the decoded matrix with "1" or "−1".

BRIEF DESCRIPTION OF THE DRAWINGS

FIG. 5A illustrates a driving matrix obtained by removing one row and one column of the Hadamard matrix illustrated in FIG. 4A, and FIG. 5B illustrates an inverse matrix of the driving matrix;

FIG. 7A illustrates a calculation table showing sensed values calculated from a simulatively set original signal and the driving matrix illustrated in FIG. 5A, and FIG. 7B illustrates a calculation table showing the sensed value combined using an extended matrix illustrated in FIG. 6;

FIG. 12 illustrates a calculation table showing sensed values calculated from a simulatively set original signal and the driving matrix illustrated in FIG. 10A;

FIG. 13A illustrates a decoded value obtained by decoding the sensed value calculated in FIG. 12 using the inverse matrix of FIG. 10B, and FIG. 13B illustrates a decoded value obtained by decoding the sensed value calculated in FIG. 12 using the extended matrix illustrated in FIG. 11.

DESCRIPTION OF THE PREFERRED EMBODIMENTS

Configuration of Capacitive Sensing Device

Figure 1:
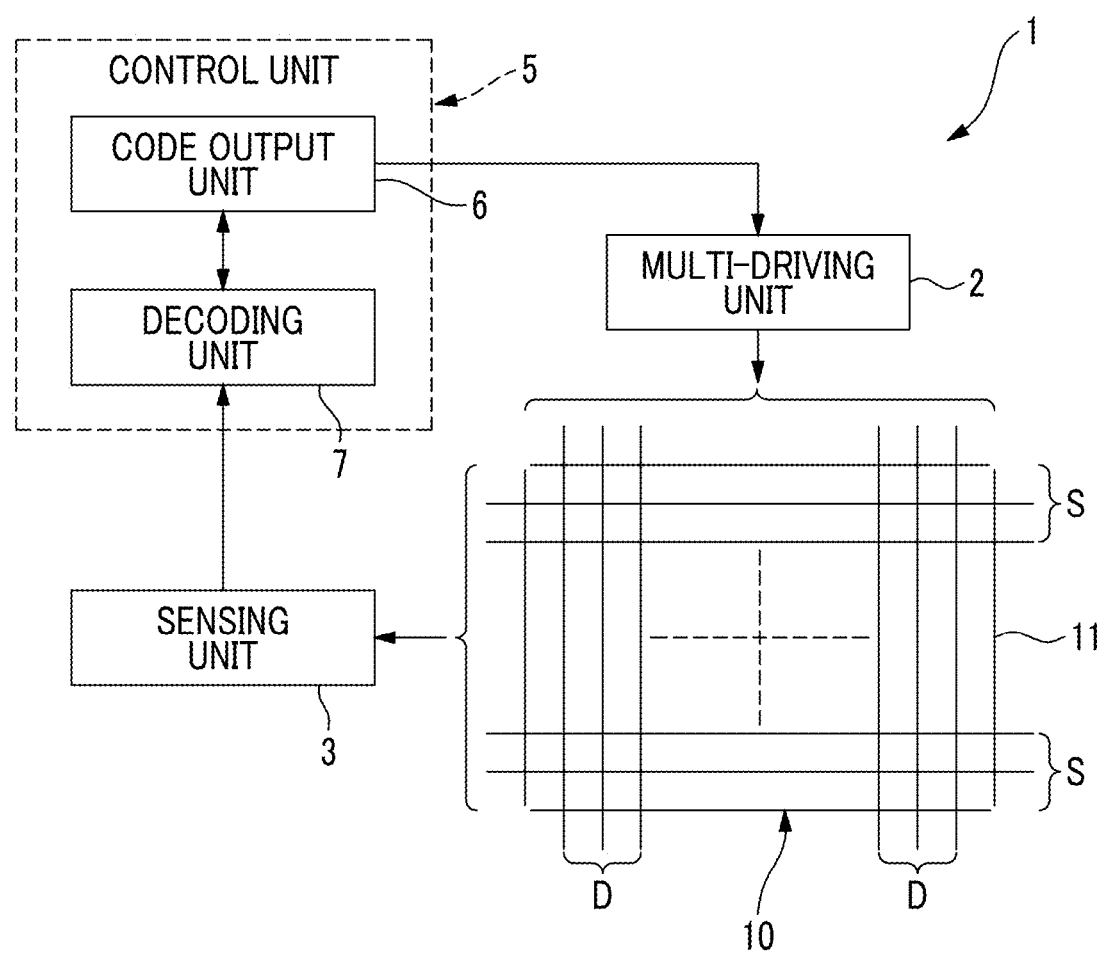
FIG. 1 is a block diagram illustrating a configuration of a capacitive sensing device of an embodiment of the present invention.

FIG. 1 is a block diagram illustrating a capacitive sensing device 1 of an embodiment of the present invention.

The capacitive sensing device 1 includes a touch pad 10. The touch pad 10 includes an insulating substrate 11. The insulating substrate 11 is a resin film, a resin substrate, or a glass substrate. When a display panel such as a liquid crystal panel is arranged on a back of the insulating substrate 11, the insulating substrate 11 is formed of a transparent material.

In the insulating substrate 11, a plurality of driving electrodes D formed in a column direction, and a plurality of sensing electrodes S formed in a row direction are provided. The driving electrode D and the sensing electrode S can be insulated from each other and formed to be orthogonal to each other.

Figure 2:
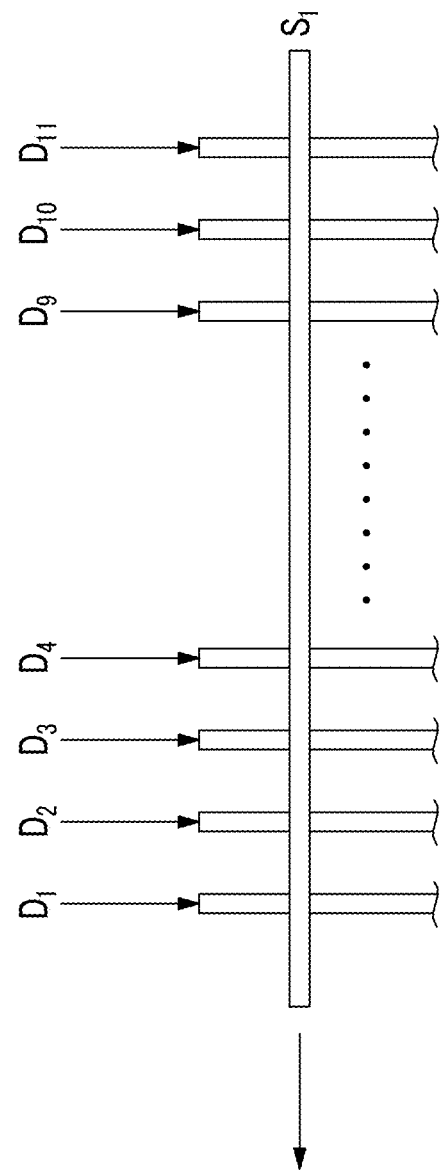
FIG. 2 is a plan view illustrating enlarged intersection portions of a plurality of driving electrodes and sensing electrodes.

In FIGS. 1 and 2, the driving electrodes D and the sensing electrode S are in a stripe shape, and capacitance is mainly formed in an intersection portion between the driving electrode D and the sensing electrode S. However, the driving electrode D and the sensing electrode S may be patterns in which square shapes or diamond shapes are connected, and capacitance may be formed between the pattern of the driving electrode D and the pattern of the sensing electrode S. Alternatively, at least one of the driving electrodes D and the sensing electrodes S may include a plurality of independent electrodes, wiring layers may extend from the respective independent electrodes, and the independent electrodes arranged in a column direction are connected via the wiring layer, or the independent electrodes arranged in a row direction may be connected via the wiring layer.

As illustrated in FIG. 1, a multi-driving unit 2 and a sensing unit 3 are provided in the capacitive sensing device 1. A driving signal is simultaneously applied from the multi-driving unit 2 to the respective driving electrodes D.

The driving signal is a driving voltage of a rectangular wave. Current flows through the respective sensing electrodes S at a rising time and a falling time of the rectangular wave, but a current value thereof is changed according to a value of the capacitance at the intersection between the driving electrode D and the sensing electrode S. A sensed value obtained by accumulating information on the capacitance in the intersection portion between the sensing electrode S and the plurality of driving electrodes D is obtained from each of the sensing electrodes S. The detection values obtained in the respective sensing electrode S are detected by the sensing unit 3.

The capacitive sensing device 1 includes a control unit 5. The control unit 5 includes a CPU and a memory. In the control unit 5, operations of controlling a code output unit 6 and a decoding unit 7 is performed.

Multi-Driving Using Matrix Code

Next, multi-driving using code and a detection operation thereof will be described.

In FIG. 2, a case in which the driving electrodes D include a total of eleven driving electrodes D1, D2, D3, . . . , D11 is exemplified. FIG. 5A illustrates a matrix of driving signals simultaneously applied from the multi-driving unit 2 to the driving electrodes D1, D2, D3, . . . , D11. A code "1" is a rectangular wave having a predetermined positive voltage, and "−1" is a rectangular wave of a predetermined negative voltage. Absolute values of the voltages of "1" and "−1" are equal to each other.

In a top end of the matrix of FIG. 5A, numerical values described as 1, 2, 3, 4, . . . , 11 in a horizontal direction correspond to the respective driving electrodes D1, D2, D3, . . . , D11 to which the driving signal is to be applied. The codes of the driving signal are set as eleven patterns as shown by t1, t2, t3, t4, . . . , t11, and the driving signal is applied to the driving electrodes D1, D2, D3, . . . , D11 in an order of t1, t2, t3, t4, . . . , t11 based on the codes of the respective driving patterns.

In the sensing unit 3, sensed values of the eleven patterns are read from one sensing electrode S1 according to respective times t1, t2, t3, t4, . . . , t11. In the decoding unit 7, the sensed values of the eleven patterns are decoded using the inverse matrix illustrated in FIG. 5B or the extended matrix illustrated in FIG. 6, and distribution of capacitance at intersection portions between one sensing electrode S1 and the eleven driving electrodes D1, D2, D3, . . . , D11 is obtained. This operation is performed on all the sensing electrodes. As a result, a change in the capacitance in N×N intersection portions of the N driving electrodes D and the N sensing electrodes S can be obtained.

In this multi-driving scheme, the distribution of the capacitance at the intersection portions between the one sensing electrode S1 and the plurality of driving electrodes D can be calculated using the N×N matrix. Therefore, when the touch pad 10 includes at least one sensing electrode S and N driving electrodes D, the distribution of the capacitance can be obtained through the multi-driving.

Driving Matrix and Decoding Matrix Based on Bailey Method

FIGS. 3 to 8 illustrate a multi-driving scheme using a driving matrix and a decoding matrix based on a Bailey method, and an extended matrix.

A Hadamard matrix based on a Bailey method has n columns and n rows, but exists when n=p+1 (p is an arbitrary prime number). n=6, 12, 14, 18, 20, 24, 30, . . . .

Figure 3A:
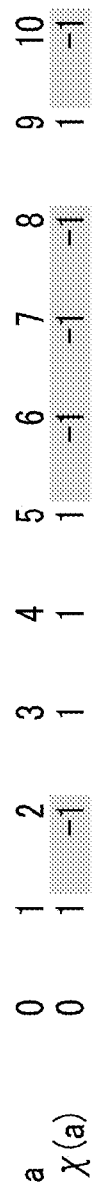
FIGS. 3A and 3B are illustrative diagrams illustrating a process of calculating a Hadamard matrix based on a Bailey method.

When x(a) referred to as a Legendre function is obtained using prime p=11, x(a) is as illustrated in FIG. 3A. The Legendre function x(a) is obtained as follows.

TABLE 1

| y | y^2 | mod(P) |
|---|---|---|
| 1 | 1 | 1 |
| 2 | 4 | 4 |
| 3 | 9 | 9 |
| 4 | 16 | 5 |
| 5 | 25 | 3 |
| 6 | 36 | 3 |
| 7 | 49 | 5 |
| 8 | 64 | 9 |
| 9 | 81 | 4 |
| 10 | 100 | 1 |

As shown in Table 1 above, a square root $y^2$=1, 4, 9, 16, 26, 36, 49, 64, 81, 100 of y=1, 2, 3, 4, 5, 6, 7, 8, 9, and 10 is obtained. A remainder obtained by dividing the square root $y^2$ by prime p=11 is a quadratic residue mod (P). When the prime number p=11, and the number of digits of the row a=10 as illustrated in FIG. 3A, the quadratic residue mod (P) includes only 1, 3, 4, 5, and 9. A code of x(a) illustrated in FIG. 3A is "1" when a is included in the quadratic residue mod (P), and "−1" when a is not included in the quadratic residue mod (P).

As illustrated in FIG. 3A, when a=1, the code of x(1) is "1" since there is "1" in the quadratic residue mod (P), when a=2, the code of x(2) is "−1" since there is "2" in the quadratic residue mod (P), and when a=3, the code of x(3) is "1" since there is "3" in the quadratic residue mod (P).

Figure 3B:
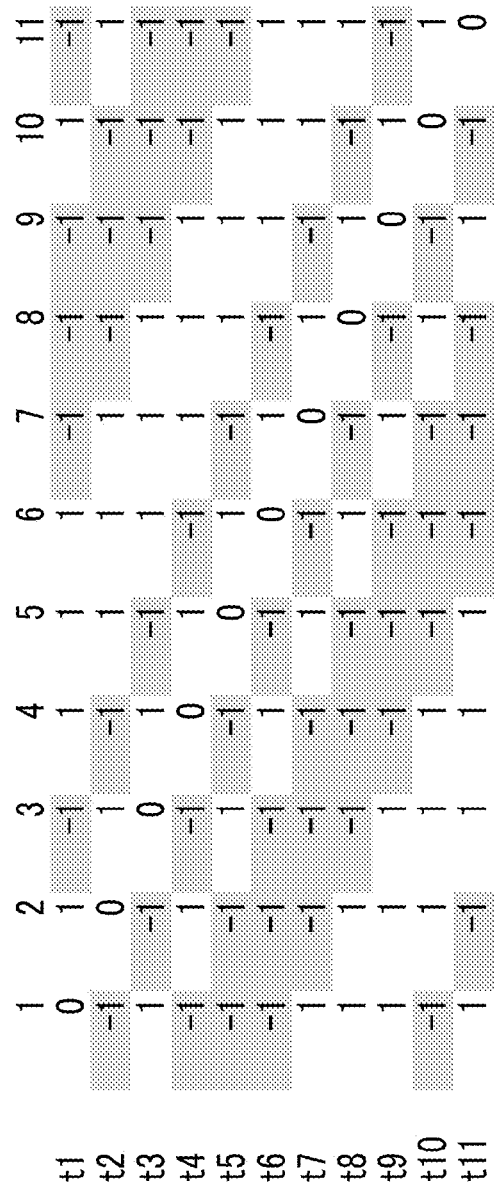

FIG. 3B illustrates a circulant matrix Q in which the function x(a) illustrated in FIG. 3A is a first row (t1), and is shifted by one column in a right direction in a second row (t2) and subsequent rows.

In this case, when a (p+1)-order matrix $H_{p+1}$ is created as shown in Equation 1 below, the matrix $H_{p+1}$ is a Hadamard matrix.

$$H_{p+1} = \begin{vmatrix} 1 & -1_p^T \\ 1_p & Q+I_p \end{vmatrix} \quad \text{[Equation 1]}$$

Figure 4A:
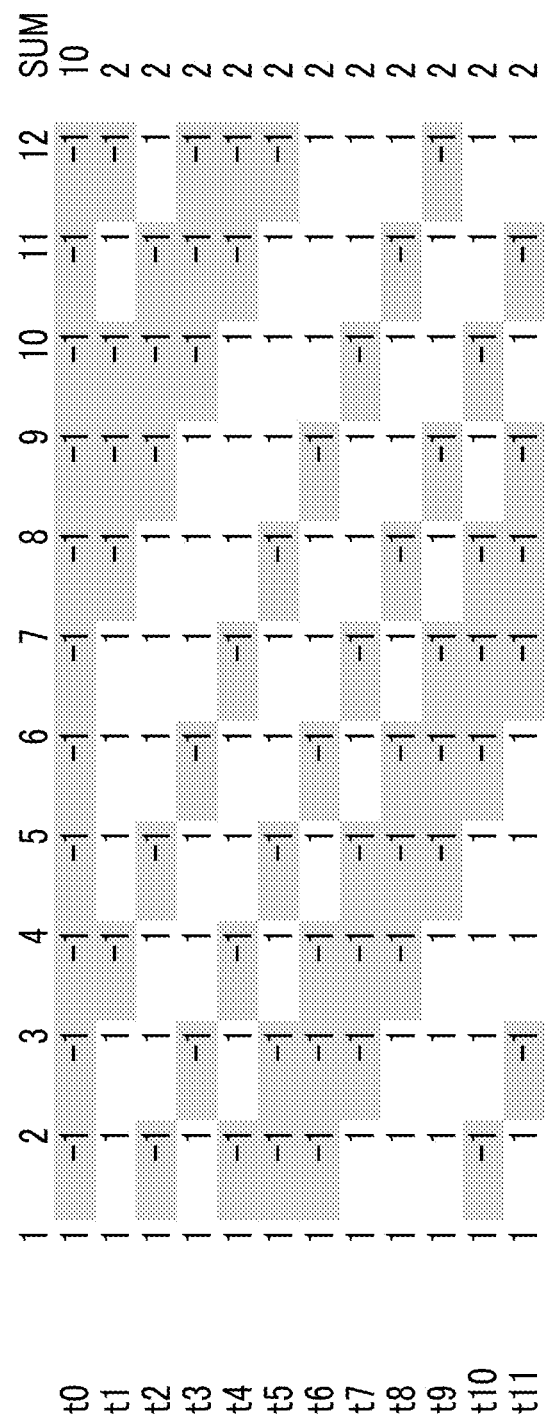
FIG. 4A illustrates a Hadamard matrix based on a Bailey method.
Figure 4B:
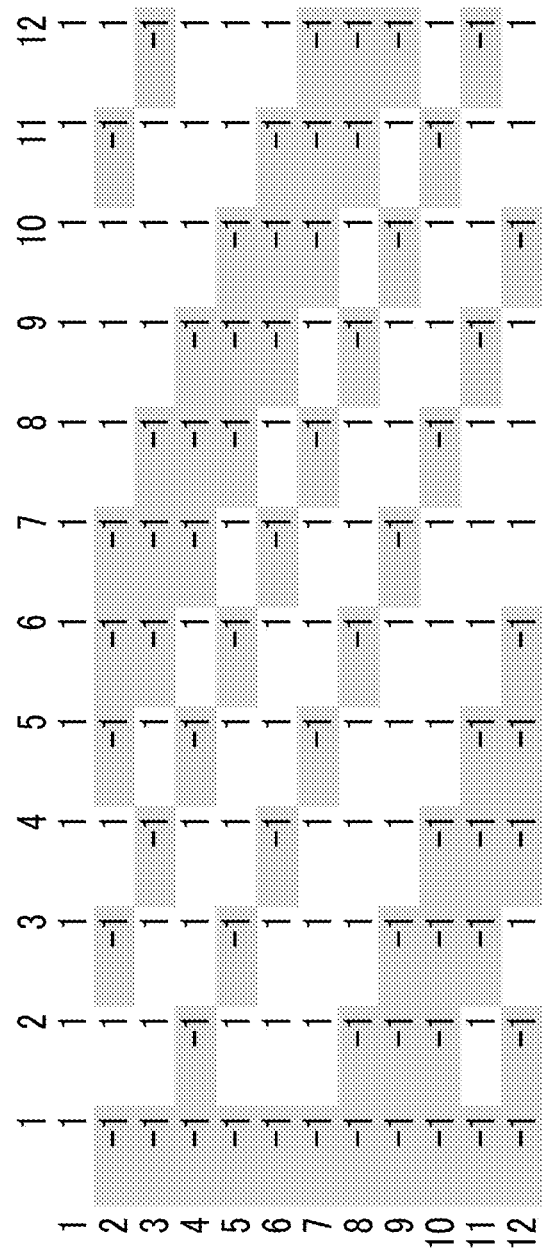
FIG. 4B illustrates an inverse matrix of the Hadamard matrix illustrated in FIG. 4A.

In FIG. 4A, the Hadamard matrix $H_{12}$ of n=p+1=12 is illustrated. In the Hadamard matrix, signs constituting all columns and all rows are "1" or "−1". In FIG. 4B, an inverse matrix of the Hadamard matrix $H_{12}$ is illustrated. The inverse matrix illustrated in FIG. 4B is a transposed matrix obtained by interchanging the columns and rows of the Hadamard matrix illustrated in FIG. 4A with each other, and signs of all rows and all columns in the inverse matrix are "1" or "−1".

When the Hadamard matrix $H_{12}$ illustrated in FIG. 4A is applied as a driving code to each driving electrode, and twelve sensed values are obtained from one sensing electrode and decoded using the inverse matrix illustrated in FIG. 4B, information based on the distribution of the capacitance in the intersection portions between the one sensing electrode S1 and the plurality of driving electrodes D1, D2, D3, . . . , D11 can be obtained.

In the Hadamard matrix $H_{12}$ illustrated in FIG. 4A, a sum of the codes of each of the second row (t1) and subsequent rows is "2", but the sum in the first row (t0) is "−10" and an absolute value is "10". Accordingly, when the driving signal of the first row (t0) is applied to each driving electrode D, a sensed value obtained from each sensing electrode S at that time increases, and a burden of the A/D converter increases. Further, voltages of the same signs are applied to the respective driving electrodes D, causing a problem in that radiated noise increases.

Therefore, in the embodiment of the present invention, a matrix obtained by removing the first row (t0) of the Hadamard matrix $H_{12}$ and a first column having a transposition relationship with the first row (t0) is used as a driving matrix, as illustrated in FIG. 5A. In the driving matrix of FIG. 5A, the number of columns N and the number of rows N are each "11". FIG. 5B is an inverse matrix of the driving matrix illustrated in FIG. 5A. This inverse matrix includes codes "1" and "0".

When the driving matrix illustrated in FIG. 5A is applied to the eleven driving electrodes D1, D2, D3, . . . , D11, and sensed values obtained from the respective sensing electrodes S are decoded using the inverse matrix illustrated in FIG. 5B, information on the distribution of the capacitance at the intersection portions between the sensing electrode S1 and the eleven driving electrodes D1, D2, D3, . . . , D11 can be obtained.

In the driving matrix illustrated in FIG. 5A, since a sum of the codes in respective rows t1, t2, t3, . . . , t11 is "1", it is possible to reduce a load of an A/D converter or the like provided in the control unit 5 that processes the sensed values obtained from the respective sensing electrodes S. Further, it is also possible to reduce radiated noise when the driving signal is applied to the plurality of driving electrodes D1, D2, D3, . . . , D11 at the same time.

Further, since the codes constituting the decoding matrix illustrated in FIG. 5B are "0" and "1", information corresponding to the distribution of the capacitance in the intersection portions between the sensing electrode S1 and the plurality of driving electrodes D1, D2, D3, . . . , D11 can be obtained through only operations of addition and subtraction in the decoding process.

However, in the decoding matrix illustrated in FIG. 5B, the code "0" is included in each row. This means that the number of driving electrodes that are operation targets at the time of decoding is reduced. The multi-driving scheme has advantages in that it is possible to average noise detected in one sensing electrode and improve an S/N ratio by simultaneously applying the driving signal to the plurality of driving electrodes and decoding the capacitance between the sensing electrode and the respective driving electrodes using the codes. However, when a large number of "0" is included in the decoding matrix, a degree of averaging of the noise is degraded.

Figure 6:
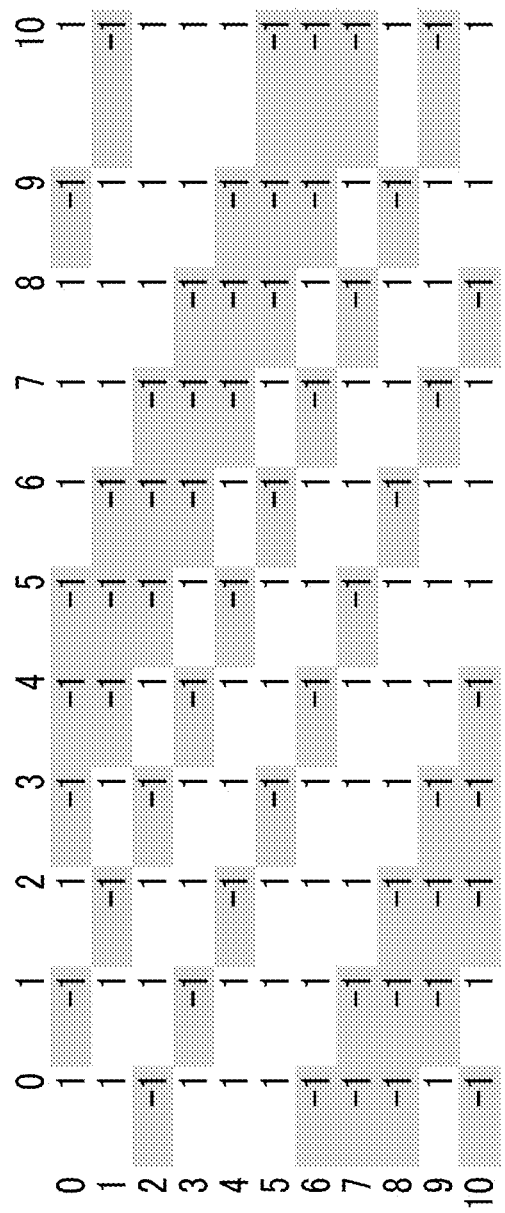
FIG. 6 illustrates an extended matrix obtained by replacing 0" of the inverse matrix illustrated in FIG. 5B with "1"

Therefore, in the embodiment of FIG. 6, an extended matrix is generated by replacing the code "0" of the decoding matrix illustrated in FIG. 5B with "4", and used as the decoding matrix.

Figure 8:
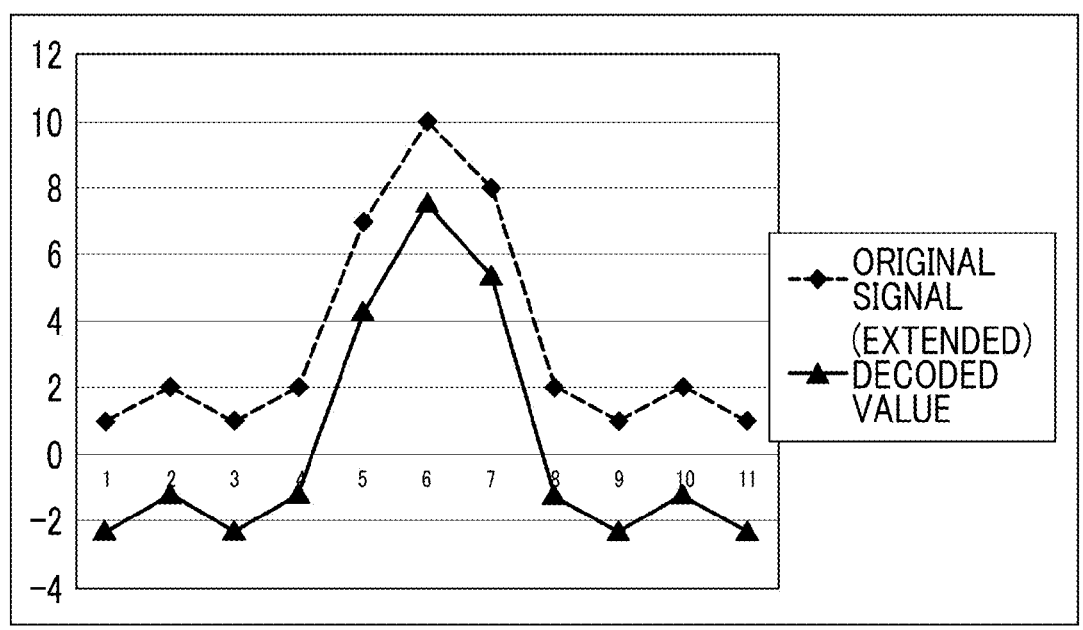
FIG. 8 is a diagram illustrating a comparison of an original signal with a composite value combined using the extended matrix of FIG. 7B.

FIG. 7A illustrates an operation example in which it is assumed that the capacitances at respective intersection portions between one sensing electrode S1 and the plurality of driving electrodes D1, D2, D3, ..., D11 are different. An original signal illustrated in FIG. 7A indicates distribution of the capacitance at respective intersection portions between one sensing electrode S1 and the plurality of driving electrodes D1, D2, D3, ..., D11. In FIG. 8, distribution of the original signal is shown in a line graph. In FIG. 8, 1, 2, 3, ..., 11 in a horizontal axis indicate intersections between the sensing electrode S1 and the driving electrodes D1, D2, D3, ..., D11.

In FIG. 7A, operation values, that is, operation values of the driving matrix and the original signal when the driving signal is applied to the driving electrodes D1, D2, D3, ..., D11 based on the driving matrix illustrated in FIG. 5A are illustrated. On the right side in FIG. 7A, sensed values from the sensing electrode S1 at the respective times t1, t2, t3, ..., t11 are shown. The sensed values are, for example, "11" at time t1, "21" at time t2, and "11" at time t3.

In FIG. 7B, an operation result of decoding the sensed values obtained from the sensing electrode S1 in FIG. 7A using the extended matrix illustrated in FIG. 6 is illustrated. Decoded values are "−2.3", "−1.2", "−2.3", ..., "−2.3" in an order of the intersections 1, 2, 3, ..., 11 of the electrodes, and are different from the original signals "1", "2", "1", ..., "1". Thus, in FIG. 8, when the decoded values "−2.3", "−1.2", "−2.3", ..., "−2.3" are plotted, it is understood that decoded values are only ones obtained by shifting the original signal to a negative side, and the distribution of the magnitude of the decoded values is similar to that of the original signal.

That is, when the driving signal is applied to the driving electrodes D based on the driving matrix illustrated in FIG. 5A, and a decoding operation is performed using the extended matrix illustrated in FIG. 6, a sensed value reflecting the distribution of the capacitance at the intersection portions between the sensing electrode S and the plurality of driving electrodes D can be obtained. Moreover, the extended matrix illustrated in FIG. 6 does not include the code "0". Accordingly, when decoding is performed using the codes in the respective rows, it is possible to average noise by the number of codes in the row direction and to improve an S/N ratio.

Driving Matrix and a Decoding Matrix Based on Sylvester Method

FIGS. 9 to 14 illustrate examples in which a driving matrix based on a Sylvester method is used.

Figure 9:
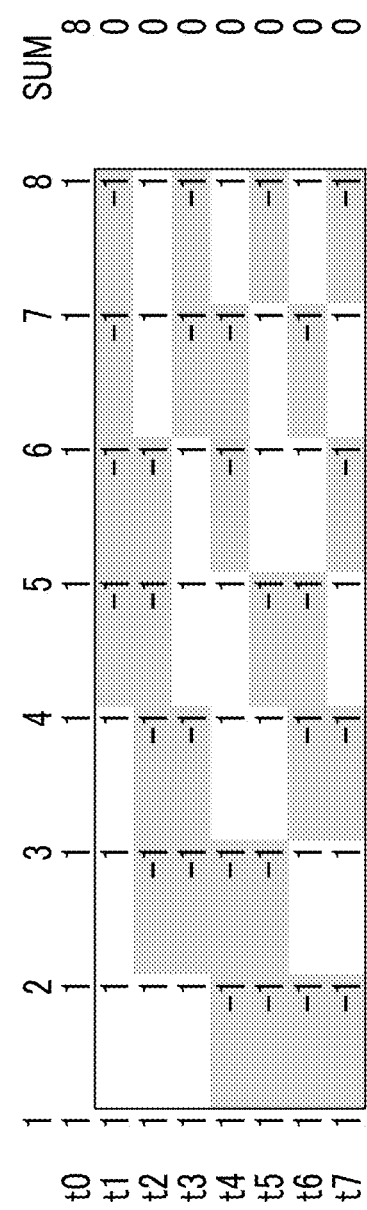
FIG. 9 illustrates a Hadamard matrix based on a Sylvester method.

In FIG. 9, a Hadamard matrix in which the number of columns and rows n=8, which is obtained a Sylvester method is shown. In this Hadamard matrix, since a sum of the codes in a first row (t0) is "8" and a variation of a sensed value of base capacitance is greater than that in other rows, it is difficult to cancel the base capacitance. Further, when a great sensed value appearing in the first row is subjected to A/D conversion, if a bit number does not greatly increase, it is difficult to detect a relatively small change in capacitance caused by approach of a finger or the like with sufficient resolution. Further, since the codes applied to the driving electrodes D at time t0 are the same, the radiated noise increases.

Therefore, in the Hadamard matrix illustrated in FIG. 9, signs of the row (t0) in which the sum is greatest and a first column having a transposition relationship with the row (t0) are removed, and a matrix in which the numbers of columns and rows N=7 is formed and used as the driving matrix. This driving matrix is illustrated in FIG. 10A.

Figure 10A:
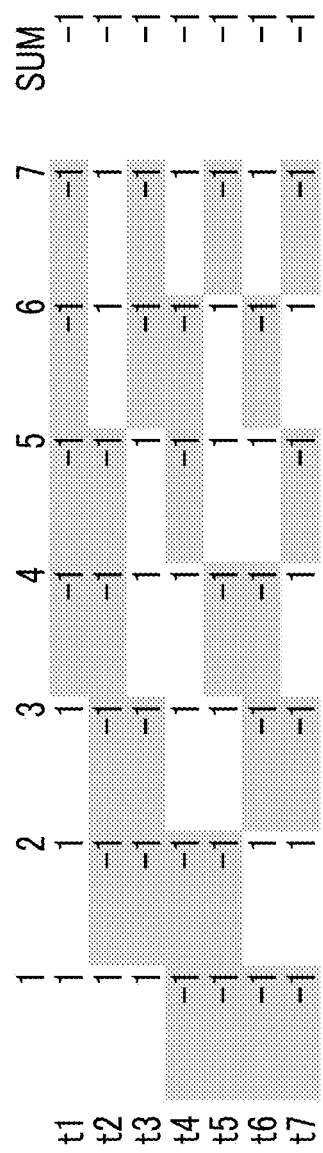
FIG. 10A illustrates a driving matrix obtained by removing one row and one column of the Hadamard matrix illustrated in FIG. 9.
Figure 10B:
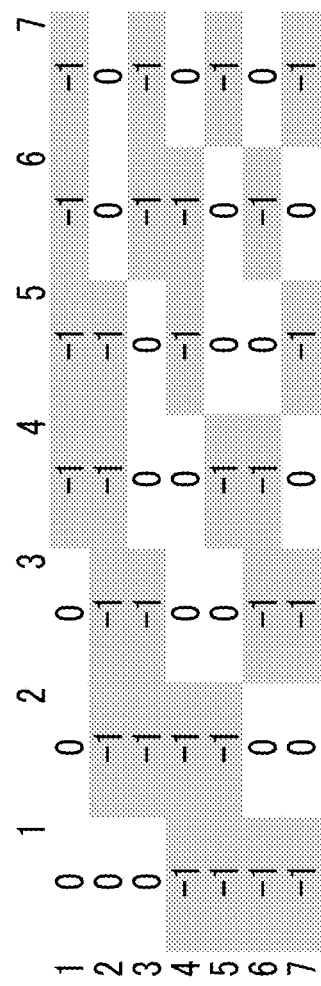
FIG. 10B illustrates an inverse matrix of the driving matrix.

FIG. 10B is an inverse matrix of the driving matrix of FIG. 10A. This inverse matrix includes codes "0" and "−1".

In the driving matrix illustrated in FIG. 10A, since a sum of the codes of each row is uniform as a small value "4", the base capacitance can be easily canceled by the decoding unit 7, and a relatively small change in capacitance caused by approach of a finger or the like can be detected with sufficient resolution even when an A/D converter having a small relatively bit number is used. Further, since the sum of the codes applied to the plurality of driving electrodes is small in each row, it is possible to reduce radiated noise when the driving electrodes are driven. Further, since the inverse matrix illustrated in FIG. 10B includes codes "0" and "4", it is possible to perform decoding through operations of addition and subtraction when the inverse matrix illustrated in FIG. 10B is used as the decoding matrix.

Figure 11:
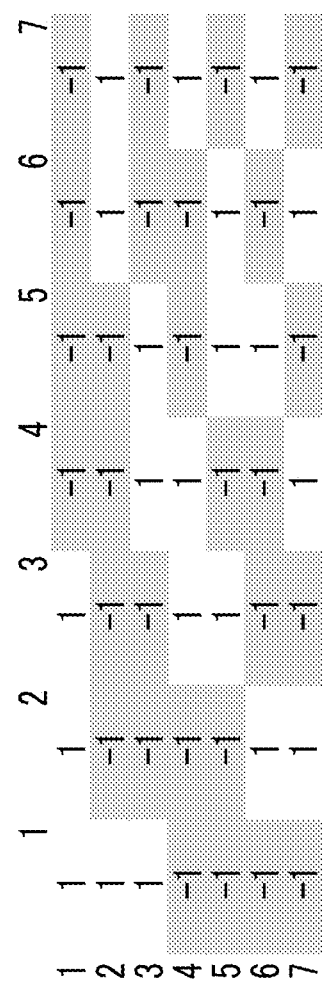
FIG. 11 illustrates an extended matrix obtained by replacing "0" of the inverse matrix illustrated in FIG. 10B with "1"

In FIG. 11, an extended matrix in which the code "0" of the inverse matrix illustrated in FIG. 10B is replaced with "−1" is illustrated. In the extended matrix illustrated in FIG. 6, "0" is replaced with "−1" in an inverse code of "1" since the codes of the inverse matrix of FIG. 5B that is a base of the extended matrix are "0" and "1", whereas in the extended matrix illustrated in FIG. 11, "0" is replaced with "1" that is an inverse code of "−1" since the codes of the inverse matrix illustrated in FIG. 10B, that is a base of the extended matrix, are "0" and "−1".

FIG. 12 illustrates an operation of modulating an original signal using the driving matrix illustrated in FIG. 10A. The original signal means distribution of the capacitance at intersections between one sensing electrode S1 and the plurality of driving electrodes D1, D2, D3, ..., D11. In FIG. 12, sensed values corresponding to times t1, t2, t3, ..., t7 obtained in the one sensing electrode S1 are shown as a an operation result of the original signal and the driving matrix illustrated in FIG. 10A.

FIG. 13A illustrates an operation value obtained by decoding the sensed values obtained in FIG. 12 using the composite matrix including the code "0" illustrated in FIG. 10B. Seven decoded values obtained in the one sensing electrode S1 are illustrated. The decoded values are the same as the original signal illustrated in FIG. 12.

FIG. 13B illustrates an operation value obtained by decoding the sensed values obtained in FIG. 12 using the extended matrix illustrated in FIG. 11. Seven decoded values obtained in the one sensing electrode S1 are illustrated. The decoded values in this case are "−2.71429" "−1.57143", ..., "−1.57143" and are not integers.

Figure 14:
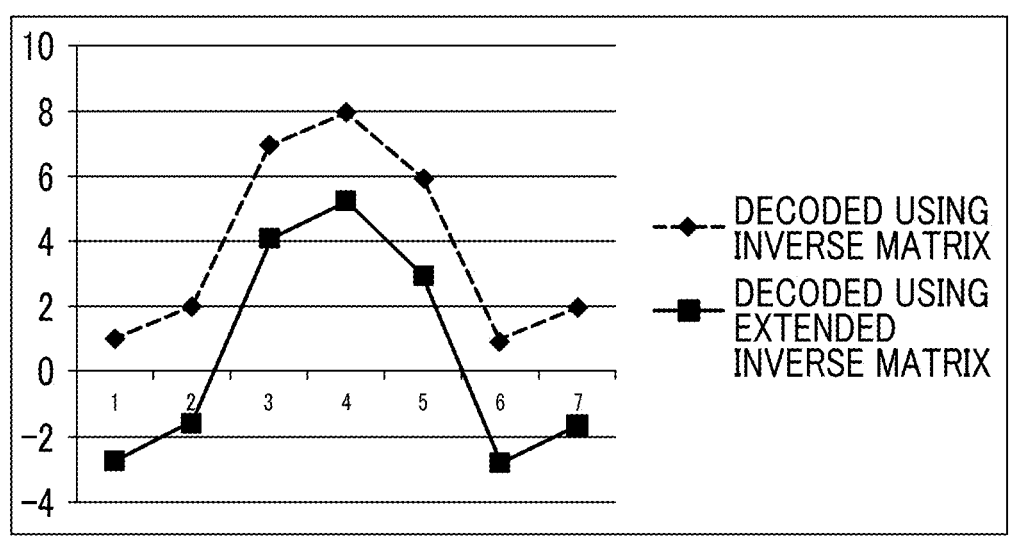
FIG. 14 is a diagram illustrating a comparison of the decoded value decoded in FIG. 13A with the decoded value decoded in FIG. 13B.

In FIG. 14, the decoded value based on the inverse matrix obtained in FIG. 13A, and the decoded value based on the extended matrix obtained in FIG. 13B are plotted. Accordingly, the decoded value obtained by decoding using the extended matrix illustrated in FIG. 11 is one obtained by shifting the decoded value obtained by decoding using the inverse matrix illustrated in FIG. 10B, that is, the original signal to a negative side by a constant value, and the obtained distribution of the capacitance is the same as that in the original signal.

When the extended matrix illustrated in FIG. 11 is used as the composite matrix, it is possible to obtain a distribution of capacitance in the intersection portions between the sensing electrode S1 and the plurality of driving electrodes D1, D2, D3, . . . , D11, similar to a case in which the inverse matrix illustrated in FIG. 10B is used. Since the extended matrix illustrated in FIG. 11 does not include the code "0", it is possible to average noise of a sensed value of the capacitance in the intersection portions between the sensing electrode S1 and the plurality of driving electrodes D1, D2, D3, . . . , D11, and improve an S/N ratio.

As described above, in the embodiment of the present invention, since at least one row in which the sum of the codes is greatest and at least one column having a transposition relationship with the row in the Hadamard matrix illustrated in FIG. 4A or 9 are removed to form the driving matrix, a variation of the sum of the codes of each row can be reduced, and thus, the base capacitance can be easily cancelled, and a relatively small change in capacitance caused by approach of a finger or the like can be detected with sufficient resolution even when an A/D converter having a relatively small bit number is used. Further, since the sum of the codes applied to the plurality of driving electrodes decreases in each row, it is possible to reduce radiated noise when the driving electrodes are driven.

Further, since the sensed value is decoded using the inverse matrix of the driving matrix obtained by removing at least one column and row in which the sum of the codes is greatest, which is a composite matrix including a code "0", it is possible to decode the original signal. Further, since decoding is performed using the extended matrix obtained by replacing "0" of the inverse matrix with "1" or "−1", it is possible to average the noise of the sensed values and improve the S/N ratio.

The present invention is not limited to the driving signal being simultaneously applied to all the driving electrodes constituting the touch pad 10. For example, some of the plurality of driving electrodes may be selected and the driving signal may be simultaneously applied to the selected driving electrodes.

It should be understood by those skilled in the art that various modifications, combinations, sub-combinations and alterations may occur depending on design requirements and other factors insofar as they are within the scope of the appended claims of the equivalents thereof.

What is claimed is:

1. A capacitive sensing device comprising:
a plurality of driving electrodes formed in a column direction;
at least one sensing electrode formed in a row direction, such that capacitance is formed between the sensing electrode and the plurality of driving electrodes;
a multi-driving unit configured to simultaneously apply respective driving signals to N driving electrodes;
a sensing unit configured to obtain a sensed signal from the at least one sensing electrode, a value of the sensed signal depending on the capacitance; and
a control unit configured to encode the driving signals to be applied from the multi-driving unit to the N driving electrodes to have respective waveform patterns by setting signs represented by an N×N driving matrix, and to decode the sensed signal obtained from the sensing unit using a decoding matrix corresponding to the driving matrix, whereby obtaining distribution of the capacitance formed between the driving electrodes and the at least one sensing electrode
wherein the driving matrix is obtained from an Hadamard matrix having rows and columns exceeding N, respectively, by removing a row and a column in which an absolute value of a sum of the signs in a row direction and a column direction, respectively, is greatest,
and wherein the Hadamard matrix is obtained based on a Bailey method.

2. The capacitive sensing device according to claim 1, wherein the row or the column in which the absolute value of the sum of the signs is greatest is constituted by the same signs "−1" or "−1".

3. The capacitive sensing device according to claim 1, wherein the decoding matrix is an extended matrix obtained by replacing a sign "0" with a sign "1" or "−1" in an inverse matrix of the driving matrix.

4. The capacitive sensing device according to claim 1, wherein the Hadamard matrix is obtained based on a Sylvester method.

5. The capacitive sensing device according to claim 1, wherein the decoding matrix is an inverse matrix of the driving matrix, the inverse matrix including signs "1" and "0" as elements thereof.

6. A capacitive sensing device comprising:
a plurality of driving electrodes formed in a column direction;
at least one sensing electrode formed in a row direction, such that capacitance is formed between the sensing electrode and the plurality of driving electrodes;
a multi-driving unit configured to simultaneously apply respective driving signals to N driving electrodes;
a sensing unit configured to obtain a sensed signal from the at least one sensing electrode, a value of the sensed signal depending on the capacitance; and
a control unit configured to encode the driving signals to be applied from the multi-driving unit to the N driving electrodes to have respective waveform patterns by setting signs represented by an N×N driving matrix, and to decode the sensed signal obtained from the sensing unit using a decoding matrix corresponding to the driving matrix, whereby obtaining distribution of the capacitance formed between the driving electrodes and the at least one sensing electrode
wherein the decoding matrix is an extended matrix obtained by replacing a sign "0" with a sign "1" or "−1" in an inverse matrix of the driving matrix,
wherein the driving matrix is obtained from an Hadamard matrix having rows and columns exceeding N, respectively, by removing a row and a column in which an absolute value of a sum of the signs in a row direction and a column direction, respectively, is greatest,
and wherein the Hadamard matrix is obtained based on a Bailey method.

* * * * *

UNITED STATES PATENT AND TRADEMARK OFFICE
CERTIFICATE OF CORRECTION

| | | |
|---|---|---|
| PATENT NO. | : 9,645,677 B2 | Page 1 of 1 |
| APPLICATION NO. | : 14/871543 | |
| DATED | : May 9, 2017 | |
| INVENTOR(S) | : Sagawai et al. | |

It is certified that error appears in the above-identified patent and that said Letters Patent is hereby corrected as shown below:

In the Claims

1. In Line 7 of Claim 1 (Column 11, Line 58) remove "configured to simultaneously apply" and replace with --that simultaneously applies--.

2. In Line 9 of Claim 1 (Column 11, Line 60) remove "configured to obtain" and replace with --that obtains--.

3. In Line 12 of Claim 1 (Column 12, Line 1) remove "configured to encode" and replace with --that encodes--.

4. In Line 7 of Claim 6 (Column 12, Line 38) remove "configured to simultaneously apply" and replace with --that simultaneously applies--.

5. In Line 9 of Claim 6 (Column 12, Line 40) remove "configured to obtain" and replace with --that obtains--.

6. In Line 12 of Claim 6 (Column 12, Line 43) remove "configured to encode" and replace with --that encodes--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*